Sept. 23, 1924. 1,509,464
T. A. BARRY
POULTRY DISINFECTING DEVICE
Filed Feb. 25, 1924 2 Sheets-Sheet 1
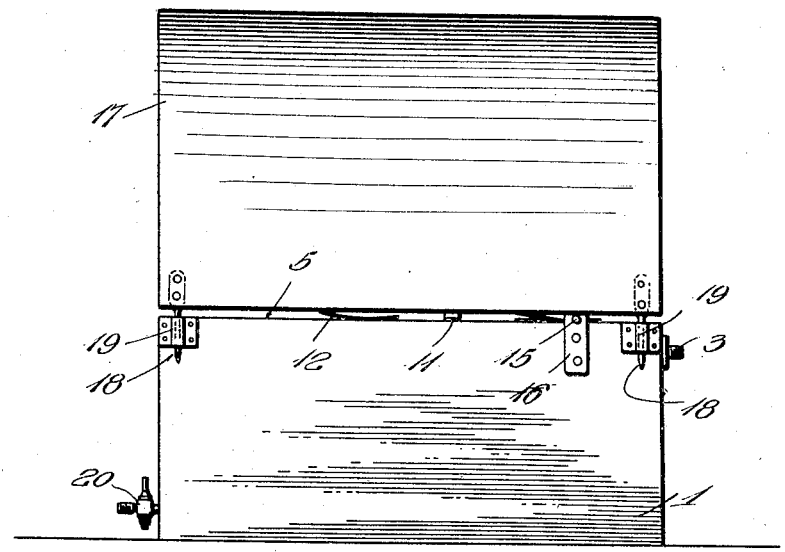
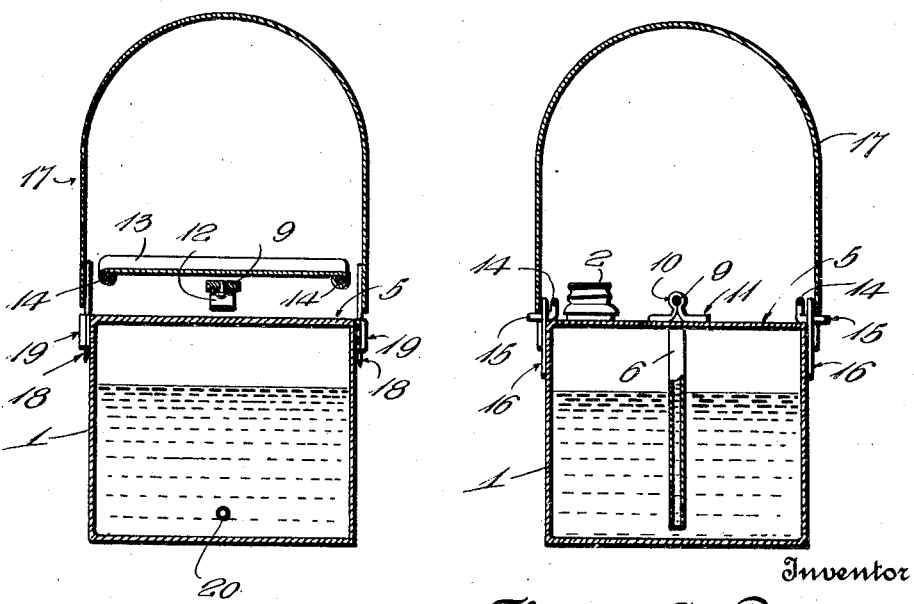

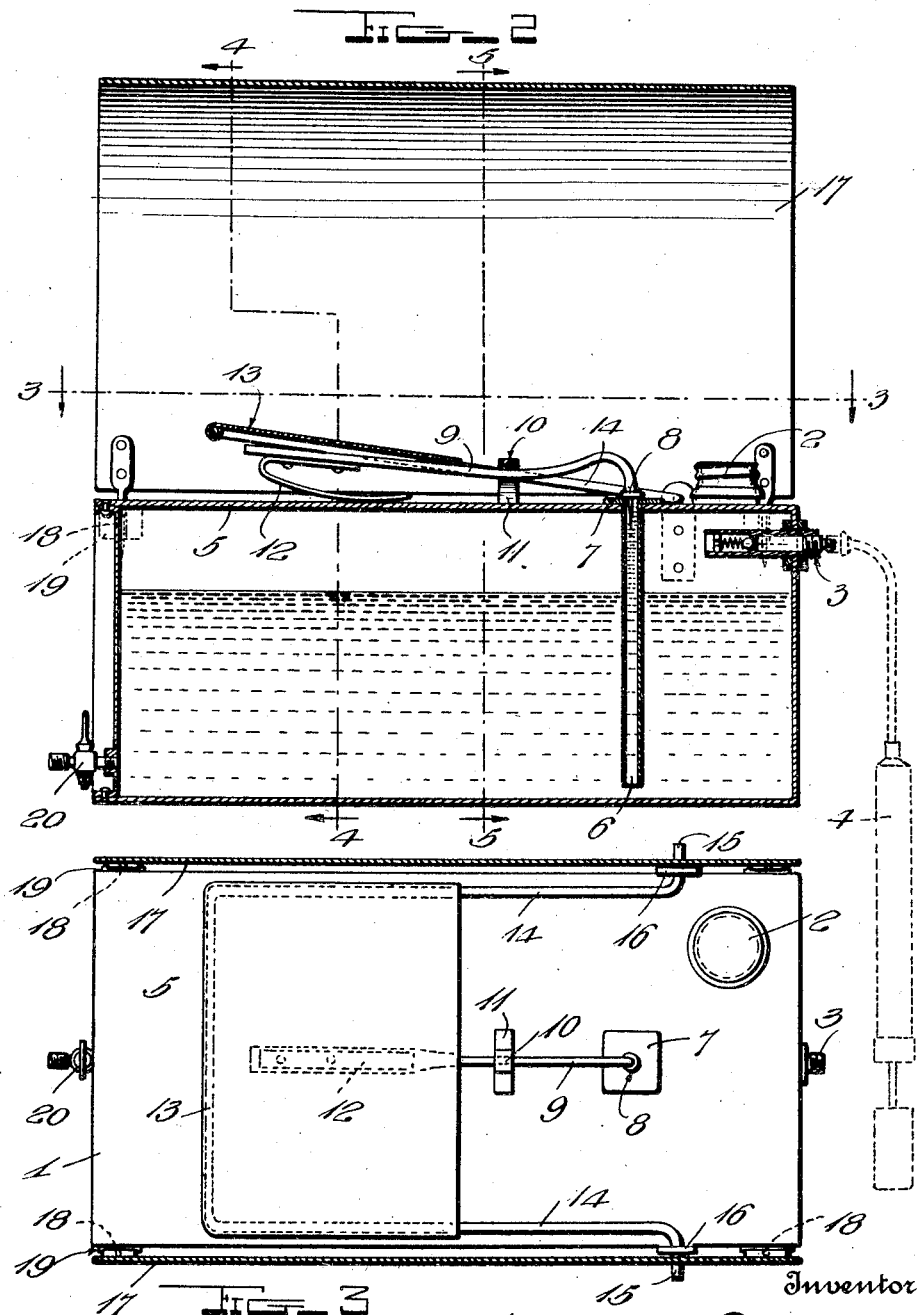

Patented Sept. 23, 1924.

1,509,464

UNITED STATES PATENT OFFICE.

THOMAS ALBERT BARRY, OF NEW HOLLAND, ILLINOIS.

POULTRY DISINFECTING DEVICE.

Application filed February 25, 1924. Serial No. 695,120.

*To all whom it may concern:*

Be it known that I, THOMAS A. BARRY, a citizen of the United States, residing at New Holland, in the county of Logan and State of Illinois, have invented certain new and useful Improvements in Poultry-Disinfecting Devices; and I do declare the following to be a full, clear, and exact description of the invention, such as will enable others skilled in the art to which it appertains to make and use the same.

My invention relates to improvements in devices for applying disinfecting liquids to poultry, and one object of the invention is to provide an exceptionally simple and inexpensive, yet an efficient device which is controlled by a treadle operated by the fowls, so that when they walk upon the device and depress the treadle, the spraying device will automatically come into play to spray the fowls with a vermin exterminating liquid.

Provision is made whereby the liquid is forced from a tank under the influence of compressed air, whenever the above-named treadle is depressed, and a further object is to provide an outlet valve from the liquid containing portion of the tank, said valve being of such nature as to permit a hose to be readily connected therewith, so that the device may be effectively used for spraying the interior of a hen-house, or for analogous purposes.

With the foregoing in view, the invention resides in the novel subject matter hereinafter described and claimed, the description being supplemented by the accompanying drawing.

Figure 1 is a side elevation.

Figure 2 is a central vertical longitudinal sectional view.

Figure 3 is a horizontal sectional view as indicated by line 3—3 of Fig. 2.

Figures 4 and 5 are vertical transverse sections on lines 4—4 and 5—5 of Fig. 2.

In the drawing above briefly described, which illustrates the preferred form of my invention, the numeral 1 designates a tank adapted to contain a vermin exterminating liquid. This tank is provided with an appropriate filling cap 2 and with a check valve 3 through which air may be forced into the tank above the liquid, by means of a suitable pump or the like 4. The tank is provided with a flat top 5 and near one end of this top, a liquid discharge pipe 6 is provided, the upper end of this pipe being secured in an opening in the top and in another opening in a plate 7 secured upon said top.

A valve 8 normally closes the upper end of the pipe 6, said valve being carried by one end of a substantially horizontal lever 9 which is fulcrumed at 10 upon an appropriate bracket 11 secured to the tank top 5. I have shown a spring 12 interposed between the other end of the lever 9 and the top 5, for holding said lever in a position to normally close the valve 8. Resting upon this end of the lever 9, however, is a treadle 13 which is here shown as provided with a pair of attaching arms 14 substantially parallel with the lever 9, said arms having outwardly turned ends 15 received in ears 16 rising from the tank 1, so as to pivotally mount the treadle. In the preferred form of construction, the arms 14 are formed by the ends of a U-shaped piece of wire and the edges of the treadle 13 are crimped around this wire as shown.

An open-ended arched hood 17 is preferably provided over the tank and associated parts, the edges of said hood being provided with depending pins 18 received removably in sockets 19 carried by the tank, so that the hood may be removed whenever desired. Whenever a fowl walks through the hood 17 along the platform, formed by the top of the tank 1, such fowl must tread upon the treadle 13 and thus the action of the spring 12 will be overcome and the lever 9 is tilted to open the valve 8, thus causing a discharge of the liquid from the tank 1 into the hood 17, so that a spray thereof is effectively applied to the bird.

Below the liquid level of the tank 1, I have shown a valve 20 to which a hose may be connected, so that when this valve is opened, the liquid from the tank will be discharged through the hose under the influence of the air pressure, and this liquid may be used for spraying the interior of a hen-house or for any other desired purpose.

As excellent results are obtainable from the details disclosed, they may be followed if desired, but within the scope of the invention as claimed, numerous minor changes may be made.

I claim:

A disinfecting device comprising a tank for containing disinfectant under pressure and having a substantially horizontal top, a discharge pipe for the disinfectant extending through the top of said tank, a lever fulcrumed between its ends over the top of said tank, a valve carried by one end of said lever and fitting in the discharge end of said pipe to close the latter, a spring disposed between the top of said tank and the other end of said lever to normally maintain said lever in the position wherein the discharge end of said pipe is closed by said valve, and a treadle pivoted at one end above the top of said tank and bearing upon the last named end of said lever to operate the latter and open said valve when depressed.

In testimony whereof I have hereunto affixed my signature.

THOS. ALBERT BARRY.